US011042466B2

(12) United States Patent
Chandra et al.

(10) Patent No.: US 11,042,466 B2
(45) Date of Patent: *Jun. 22, 2021

(54) EXCEPTION PREDICTION BEFORE AN ACTUAL EXCEPTION DURING DEBUGGING

(71) Applicant: INTERNATIONAL BUSINESS MACHINES CORPORATION, Armonk, NY (US)

(72) Inventors: Vikas Chandra, Bangalore (IN); Sarika Sinha, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 90 days.

This patent is subject to a terminal disclaimer.

(21) Appl. No.: 16/238,577

(22) Filed: Jan. 3, 2019

(65) Prior Publication Data

US 2019/0138425 A1    May 9, 2019

Related U.S. Application Data

(63) Continuation of application No. 15/794,075, filed on Oct. 26, 2017, now Pat. No. 10,216,609, which is a
(Continued)

(51) Int. Cl.
*G06F 9/44* (2018.01)
*G06F 11/36* (2006.01)
(Continued)

(52) U.S. Cl.
CPC .......... *G06F 11/362* (2013.01); *G06F 11/366* (2013.01); *G06F 11/3608* (2013.01);
(Continued)

(58) Field of Classification Search
CPC .. G06F 11/362; G06F 11/3608; G06F 11/366; G06F 11/3664; G06F 8/43; G06F 11/3452
(Continued)

(56) References Cited

U.S. PATENT DOCUMENTS 7,343,602 B2    3/2008   Luk
7,451,210 B2   11/2008   Gupta
(Continued)

OTHER PUBLICATIONS

Ahmadzadeh, Marzieh et al.; An Analysis of Patterns of Debugging Among Novice Computer Science Students; ITiCSE '05; Jun. 27-29, 2005; pp. 84-88.
(Continued)

*Primary Examiner* — Chuck O Kendall
(74) *Attorney, Agent, or Firm* — Schmeiser, Olsen & Watts; Nicholas L. Cadmus

(57) ABSTRACT

An approach is provided for predicting an exception during a debugging of software code before the debugging encounters the exception. During a debugging of a line number L of the code and based on an exception being predicted to be encountered at a line number M, a warning is displayed that the exception is to be encountered at the line number M, which is within a range of line numbers L+1 through L+X, where L>0 and X>1. Using a fix written in response to the predicted exception, the software code is modified. During a debugging of the line number M of the code, the modified software code is executed to avoid the predicted exception.

20 Claims, 4 Drawing Sheets

Related U.S. Application Data continuation of application No. 15/006,821, filed on Jan. 26, 2016, now Pat. No. 9,870,306.

(51) Int. Cl.
*G06F 8/41* (2018.01)
*G06F 11/34* (2006.01)

(52) U.S. Cl.
CPC .......... *G06F 11/3664* (2013.01); *G06F 8/43* (2013.01); *G06F 11/3452* (2013.01)

(58) Field of Classification Search
USPC ........................................................ 717/124
See application file for complete search history.

(56) References Cited

U.S. PATENT DOCUMENTS

| | | | |
|---|---|---|---|
| 7,895,323 | B2 | 2/2011 | Gupta |
| 8,745,572 | B2 | 6/2014 | Zimmermann |
| 9,189,308 | B2 | 11/2015 | Young |
| 9,652,316 | B2 | 5/2017 | Gamage |
| 9,870,306 | B2 * | 1/2018 | Chandra ............... G06F 11/366 |
| 10,216,609 | B2 * | 2/2019 | Chandra ............. G06F 11/3664 |
| 2002/0055964 | A1 | 5/2002 | Luk |
| 2008/0282104 | A1 | 11/2008 | Khan |
| 2009/0070628 | A1 | 3/2009 | Gupta |
| 2011/0022551 | A1 | 1/2011 | Dixon |
| 2012/0166869 | A1 | 6/2012 | Young |
| 2012/0331439 | A1 | 12/2012 | Zimmermann |
| 2014/0040692 | A1 | 2/2014 | Shah |
| 2016/0062817 | A1 | 3/2016 | Young |
| 2016/0321160 | A1 | 11/2016 | Joo |
| 2017/0212826 | A1 | 7/2017 | Chandra |
| 2018/0046563 | A1 | 2/2018 | Chandra |

OTHER PUBLICATIONS

Aljahdali, Sultan H. et al.; Prediction of Software Reliability: A Comparison between Regression and Neural Network Non-Parametric Models; Proceedings ACS/IEEE International Conference on Computer Systems and Applications; Jun. 25-29, 2001; pp. 470-473.

Dimitrov, Martin et al.; Anomaly-Based Bug Prediction, Isolation, and Validation: An Automated Approach for Software Debugging; APSLOS'09; Mar. 7-11, 2009; pp. 61-72.

Gao, Kehan et al.; Improving Software Quality Estimation by Combining Boosting and Feature Selection; 12th International Conference on Machine Learning and Applications; Dec. 4-7, 2013; pp. 27-33.

Hall, Tracy et al.; A Systematic Literature Review on Fault Prediction Performance in Software Engineering; IEEE Transactions on Software Engineering, vol. 38, No. 6; Nov./Dec. 2012; pp. 1276-1304.

Kapur, P.K. et al.; A Unified Approach for Developing Software Reliability Growth Models in the Presence of Imperfect Debugging and Error Generation; IEEE Transactions on Reliability, vol. 60, No. 1; Mar. 2011; pp. 331-340.

Lewis, Chris et al.; Bug Prediction at Google; URL: http://google-engtools.blogspot.in/2011/12/bug-prediction-at-google.html; Retrieved from the Internet Apr. 23, 2015; 4 pages.

Marlow, Simon; An Extensible Dynamically-Typed Hierarchy of Exceptions; Proceedings of the 2006 ACM SIGPLAN Workshop on Haskell; Sep. 17, 2006; pp. 96-106.

Miao, Linsong et al.; Cost-Sensitive Feature Selection with Application in Software Defect Prediction; 21st International Conference on Pattern Recognition; Nov. 11-12, 2012; pp. 967-970.

Sawadpong, Puntitra; Toward a Defect Prediction Model of Exception Handling Method Call Structures; Proceedings of the 2014 ACM Southeast Regional Conference, Article No. 40; Mar. 28-29, 2014; 4 pages.

Syta, James M.; List of IBM Patents or Patent Applications Treated as Related; Jan. 3, 2019; 1 page.

Takahashi, Muneo et al.; An Empirical Study of a Model for Program Error Prediction; IEEE Transactions on Software Engineering, vol. 15. No. 1; Jan. 1989; pp. 82-86.

Velev, Miroslav N. et al.; Formal Verification of Superscalar Microprocessors with Multicycle Functional Units, Exceptions, and Branch Prediction; Proceedings of the 37th Annual Design Automation Conference; Jun. 5-9, 2000, pp. 112-117.

Zilles, Craig B. et al.; The Use of Multithreading for Exception Handling; Proceedings of the 32nd Annual ACM/IEEE International Symposium on Microarchitecture; Nov. 16-8, 1999; 11 pages.

* cited by examiner

300

...

Line number 20 IPackageFragmentRoot fragmentRoot = getFragmentRoot();
Line number 21 boolean isArchive = fragmentRoot.isArchive();
Line number 22 IJavaElement[] packageFragments = fragmentRoot.getChildren();
Line number 23 for (int j = 0, max2 = packageFragments.length; j < max2; j++) {
Line number 24   IPackageFragment paF = (IPackageFragment)packageFragments[j];
Line number 26   addElementFor(packageFragment, isArchive, apiComp, scope);
Line number 27 }

EXCEPTION PREDICTION BEFORE AN ACTUAL EXCEPTION DURING DEBUGGING

CROSS REFERENCE TO RELATED APPLICATIONS

This application is a continuation application claiming priority to Ser. No. 15/794,075 filed Oct. 26, 2017, now U.S. Pat. No. 10,216,609, issued Feb. 26, 2019, which is a continuation application claiming priority to Ser. No. 15/006,821 filed Jan. 26, 2016, now U.S. Pat. No. 9,870,306 issued Jan. 16, 2018, the contents of which are hereby incorporated by reference.

BACKGROUND

The present invention relates to developing software and more particularly to software debugging.

A debugging tool is a computer program used to test computer software and find and resolve defects (i.e., bugs) that prevent the computer software from operating correctly. Known debugging tools support various debugging functions, including single-stepping (i.e., running a program step by step; also known as program animation), breaking the program at a specified event or instruction by means of a breakpoint, and tracking the values of variables. Some known debugging tools can modify the state of a computer program while the program is running. Known debugging tools may have the ability to continue execution of the computer program being debugged at a different location in the program to avoid a crash or logical error. The debugging function of single-stepping executes code of a software program one line at a time (i.e., step by step). A programmer who employs single-stepping observes the state of a software program before and after execution of a particular line of code, thereby allowing an evaluation of the effects of the statement or instruction specified by the line of code and an analysis of the behavior of the executing program.

SUMMARY

In a first embodiment, the present invention provides a method of predicting an exception during debugging of software code before the debugging encounters the exception. The method includes a computer receiving a number (X) of lines of the software code. The method further includes the computer debugging a current line number L of the software code. The method further includes the computer executing in a new thread upcoming lines of the software code consisting of at least line number (L+1) through line number (L+X) of the software code. The method further includes based on the upcoming lines of the software code being executed in the new thread, the computer predicting that the exception will be encountered at line number M of the software code and determining the line number M is within a range of line number (L+1) through line number (L+X), inclusively. The method further includes based on the exception being predicted to be encountered at the line number M and the line number M being within the range of line number (L+1) through line (L+X), inclusively, and during the debugging of the current line number L, the computer displaying a warning that the exception is likely to be encountered at line number M. The method further includes responsive to the displayed warning, the computer receiving an indication that a corrective action was taken to avoid the exception.

In a second embodiment, the present invention provides a computer program product including a computer-readable storage device and a computer-readable program code stored in the computer-readable storage device. The computer-readable program code includes instructions that are executed by a central processing unit (CPU) of a computer system to implement a method of predicting an exception during debugging of software code before the debugging encounters the exception. The method includes the computer system receiving a number (X) of lines of the software code. The method further includes the computer system debugging a current line number L of the software code. The method further includes the computer system executing in a new thread upcoming lines of the software code consisting of at least line number (L+1) through line number (L+X) of the software code. The method further includes based on the upcoming lines of the software code being executed in the new thread, the computer system predicting that the exception will be encountered at line number M of the software code and determining the line number M is within a range of line number (L+1) through line number (L+X), inclusively. The method further includes based on the exception being predicted to be encountered at the line number M and the line number M being within the range of line number (L+1) through line (L+X), inclusively, and during the debugging of the current line number L, the computer system displaying a warning that the exception is likely to be encountered at line number M. The method further includes responsive to the displayed warning, the computer system receiving an indication that a corrective action was taken to avoid the exception.

In a third embodiment, the present invention provides a computer system including a central processing unit (CPU); a memory coupled to the CPU; and a computer-readable storage device coupled to the CPU. The storage device includes instructions that are executed by the CPU via the memory to implement a method of predicting an exception during debugging of software code before the debugging encounters the exception. The method includes the computer system receiving a number (X) of lines of the software code. The method further includes the computer system debugging a current line number L of the software code. The method further includes the computer system executing in a new thread upcoming lines of the software code consisting of at least line number (L+1) through line number (L+X) of the software code. The method further includes based on the upcoming lines of the software code being executed in the new thread, the computer system predicting that the exception will be encountered at line number M of the software code and determining the line number M is within a range of line number (L+1) through line number (L+X), inclusively. The method further includes based on the exception being predicted to be encountered at the line number M and the line number M being within the range of line number (L+1) through line (L+X), inclusively, and during the debugging of the current line number L, the computer system displaying a warning that the exception is likely to be encountered at line number M. The method further includes responsive to the displayed warning, the computer system receiving an indication that a corrective action was taken to avoid the exception.

Embodiments of the present invention provides an enhanced debugging process that speeds up an analysis of an exception and taking a local corrective action that fixes the exception. Further, embodiments of the present invention may analyze a function for possible exceptions via locally changing variables. Still further, embodiments of the present invention provide a generation of exception prediction information for a method. Other embodiments present possible exceptions that result from local modifications of respective combinations of variables during a debugging session.

BRIEF DESCRIPTION OF THE DRAWINGS

FIG. 3 is an example of a function being debugged using the process of FIG. 2, in accordance with embodiments of the present invention.

DETAILED DESCRIPTION

Overview

Embodiments of the present invention realize that while a programmer is employing single-stepping provided by known debugging tools, an exception (e.g., a Null Pointer Exception (NPE)) being encountered causes the debug control to go to another file where the exception is caught, which happens because the programmer typically does not inspect the values of all variables in all step overs. It is extremely common for a programmer using known debugging techniques to quickly step over the lines of code in order to reach the exception location. Existing debugging tools are limited to stopping at the line of a particular exception, rather than stopping a particular number of lines before an exception is expected to be encountered.

Embodiments of the present invention predict an exception during a debugging session before single-stepping encounters the actual exception. The prediction of the exception is accomplished by analyzing the next "X" lines of code, where X is a specified integer greater than or equal to one. The number of lines X is a parameter that may be passed by a user and that depends on the code that is being debugged. By being notified of the predicted exception, the user can more easily analyze the code and take corrective actions. In one embodiment, an option is available to allow the user to specify certain types of exceptions that are to be predicted and whose prediction the user is to be notified about, whereas other types of exceptions that are not specified are not predicted. In one embodiment, the notification about the prediction includes mentioning the line number at which the exception is likely to be encountered. The notification helps the user locate the exception location as well as quickly find out the reason for the exception. The user need not run the debugger again with the same configuration as done earlier to reproduce the exception and possibly modify the code to fix the exception situation. Embodiments of the present invention provide exception prediction during debugging that advantageously avoids corrupting data and/or exiting the application.

System for Predicting an Exception

Figure 1:
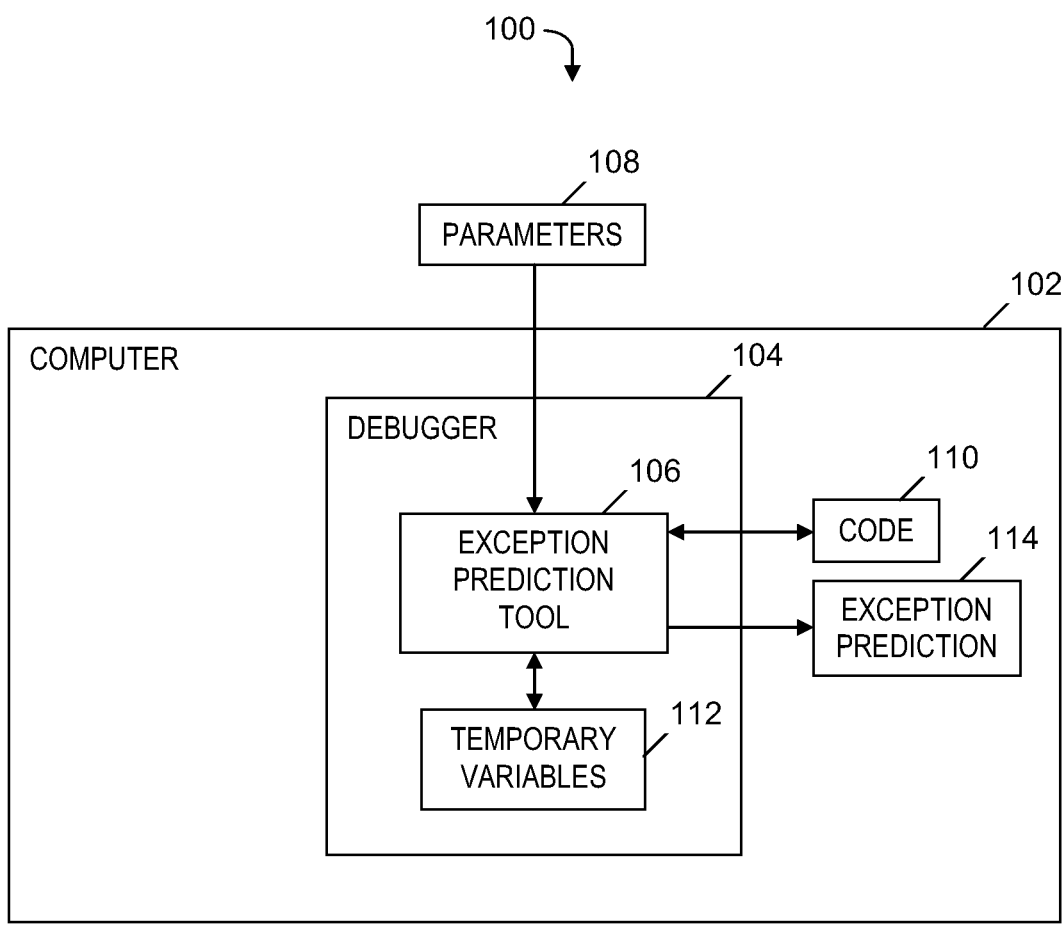
FIG. 1 is a block diagram of a system for predicting an exception before single-stepping debugging of software encounters an actual exception, in accordance with embodiments of the present invention.

FIG. 1 is a block diagram of a system 100 for predicting an exception before single-stepping debugging of software encounters an actual exception, in accordance with embodiments of the present invention. System 100 includes a computer 102, which executes a debugger 104, which is a software-based debugging tool. Debugger 104 has single-stepping capability and includes a software-based exception prediction tool 106 which predicts an exception before single-stepping encounters an actual exception during a debugging session. Parameters 108 provided by a user and software code 110 are received by exception prediction tool 106. Parameters 108 include a number (i.e., X) of lines of code 110, which determines which lines of code subsequent to a line of code currently being debugged are to be run via a new thread (not shown). In one embodiment, as debugger 104 debugs a line number L of code 110 with single-stepping, exception prediction tool 106 executes in a new thread upcoming lines of code included in code 110 which include an inclusive range of line numbers (L+1) through (L+X).

In another embodiment, exception prediction tool 106 determines that a specified block (e.g., a for loop or a while loop) of code starts, but does not end, within the range of line numbers (L+1) through (L+X) included in code 110. In this other embodiment, the upcoming lines of code in code 110 include line numbers (L+1) through the end of the specified block, where the end of the block is at a line number of code 110 that is after line number (L+X).

Exception prediction tool 106 determines data (i.e., variable data) that changes in the execution of the upcoming lines of code and stores the variable data in temporary variables 112 in a data repository (not shown) so that the actions in the execution of the upcoming lines of code are undone after the prediction of the exception is completed.

By analyzing the results of executing the upcoming lines included in code 110, exception prediction tool 106 predicts that an exception is likely to occur at a particular line number M of code 110. In one embodiment, line number M is in the inclusive range of line numbers (L+1) through (L+X). In another embodiment in which the specified block of code is determined to start within the range of line numbers (L+1) through (L+X) but ends after line number (L+X), the line number M is within the range of line number (L+1) through the end of the specified block.

Exception prediction tool 106 generates and displays an exception prediction 114 to a user. Exception prediction 114 is generated based on the analysis of the results of executing the upcoming lines included in code 110. Exception prediction 114 is displayed to the user in response to the debugging of the line of code 110 having line number L (or in response to the debugging of a line of code 110 having the line number at the beginning of a function whose execution encounters the predicted exception). Exception prediction 114 is displayed to the user before debugger 104 debugs the line of code 110 having line number M.

In one embodiment, parameters 108 include one or more types of exceptions to be predicted and exception prediction tool 106 predicts only an exception that is of a type that is included in the one or more types of exceptions included in parameters 108.

Figure 2:
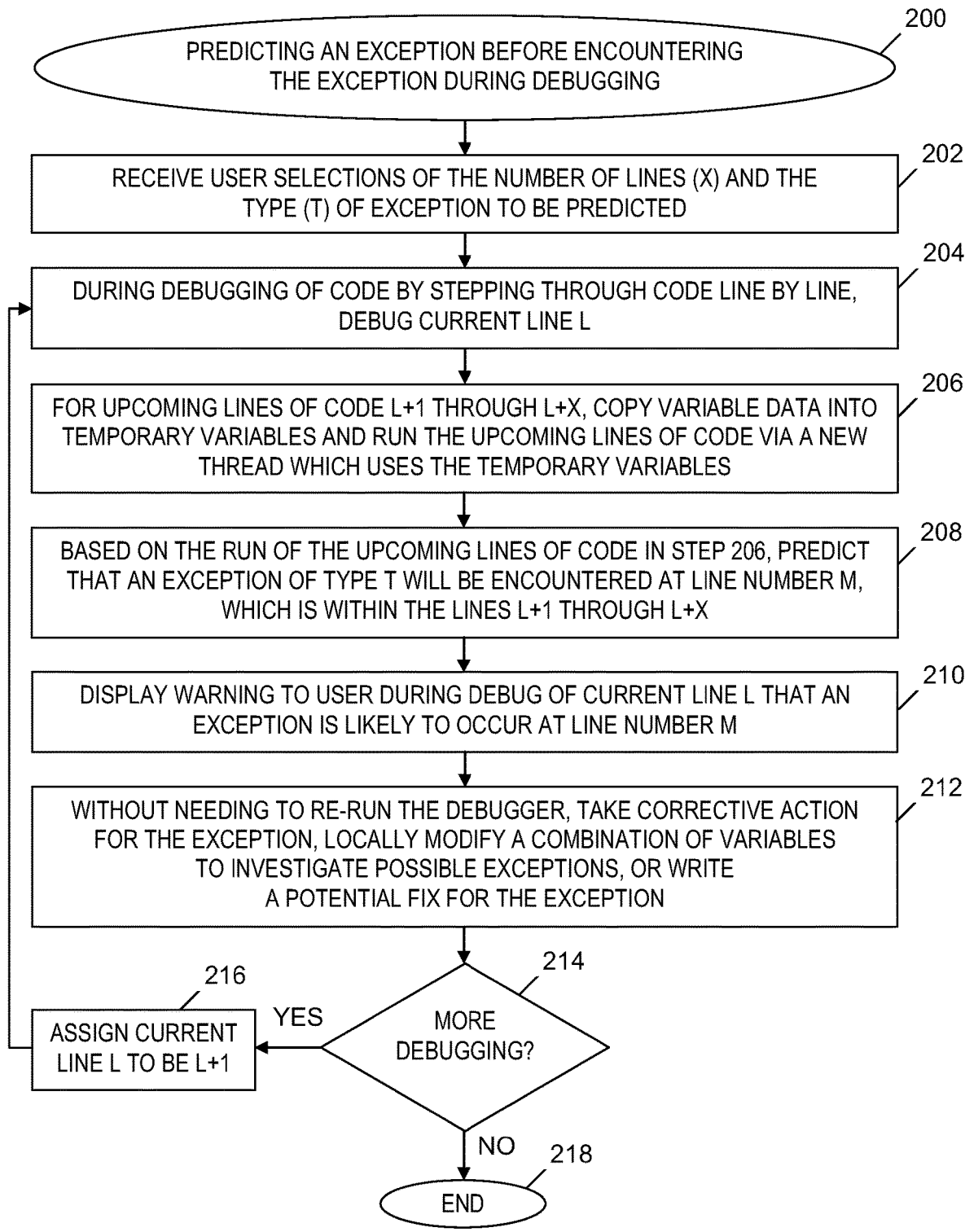
FIG. 2 is a flowchart of a process of predicting an exception before single-stepping debugging of software encounters an actual exception, where the process is implemented in the system of FIG. 1, in accordance with embodiments of the present invention.

The functionality of the components shown in FIG. 1 is described in more detail in the discussion of FIG. 2 and FIG. 3 presented below.

Process for Predicting an Exception

FIG. 2 is a flowchart of a process of predicting an exception before single-stepping debugging of software encounters an actual exception, where the process is implemented in the system of FIG. 1, in accordance with embodiments of the present invention. The process of FIG. 2 begins at step 200. In step 202, exception prediction tool 106 (see FIG. 1) receives user selection(s) of a number (i.e., X) of lines of code included in code 110 (see FIG. 1) and optionally includes a type (i.e., T) of an exception whose prediction the user desires a notification.

In step 204 and during a debugging of code 110 (see FIG. 1) that includes a line by line stepping through code 110 (see FIG. 1), exception prediction tool 106 (see FIG. 1) debugs a current line L of code 110 (see FIG. 1).

In step 206, exception prediction tool 106 (see FIG. 1) (1) copies variable data for upcoming lines (L+1) through (L+X) of code included in code 110 (see FIG. 1) into temporary variables 112 (see FIG. 1) and (2) runs the upcoming lines of code included in code 110 (see FIG. 1) which uses temporary variables 112 (see FIG. 1). In one embodiment, running the upcoming lines of code is performed via a new thread.

In step 208, based on the run of the upcoming lines of code in step 206, exception prediction tool 106 (see FIG. 1) predicts that an exception will be encountered in response to single-stepping debugging of line number M, which is within the inclusive range of line numbers (L+1) through (L+X). In one embodiment, step 202 includes exception prediction tool 106 (see FIG. 1) receiving the type T of the exception, and step 208 includes exception prediction tool 106 (see FIG. 1) predicting the exception only if exception prediction tool 106 (see FIG. 1) determines in step 208 that the predicted exception is of the type T.

In step 210, exception prediction tool 106 (see FIG. 1) displays a warning to the user during the single-stepping debug of current line L that the exception predicted in step 208 is likely to occur when the single-stepping debugging reaches line number M.

In an alternative embodiment, exception prediction tool 106 (see FIG. 1) determines that a specified block (e.g., a for loop or a while loop) starts, but does not end, in the range of lines numbers (L+1) through (L+X). In this alternative embodiment, exception prediction tool 106 (see FIG. 1) determines that the specified block ends at line number (L+X+Z), which is a line number that occurs in code 110 (see FIG. 1) after line number (L+X). In this case, the upcoming lines of code included in code 110 (see FIG. 1) are the inclusive range of line numbers (L+1) through (L+X+Z), which includes the aforementioned line number M at which the predicted exception is likely to occur.

In step 212, without requiring the debugger 104 (see FIG. 1) to be re-run with the same configuration being used in the current debugging session to reproduce the exception, the user (1) takes corrective action to avoid the predicted exception when line number M is the current line being debugged by single-stepping, (2) locally modifies a combination of variables to investigate other possible exceptions that may occur by executing the upcoming lines of code, or (3) writes a potential fix of code 110 (see FIG. 1) to avoid the predicted exception, and subsequently, exception prediction tool 106 (see FIG. 1) receives an indication that the aforementioned corrective action, locally modified combination of variables, or writing of the potential fix was performed.

In step 214, exception prediction tool 106 (see FIG. 1) determines whether more debugging is required in the debugging session. If exception prediction tool 106 (see FIG. 1) determines in step 214 that more debugging is required, then the Yes branch of step 214 is taken and step 216 is performed.

In step 216, exception prediction tool 106 (see FIG. 1) assigns the current line L to be line (L+1) and the process loops back to step 204, as described above.

Returning to step 214, if exception prediction tool 106 (see FIG. 1) determines that more debugging is not required, then the debugging session is complete, the No branch of step 214 is taken, and step 218 is performed.

The process of FIG. 2 ends at step 218.

In one embodiment, exception prediction tool 106 (see FIG. 1) presents options to a user, so that the user may specify that the user wants to receive warnings about only particular predicted exceptions during a debugging session. A user may benefit from prior warning in step 210 (see FIG. 2) about particular exceptions the user has identified prior to step 210, such as ClassCastException, IndexOutOfBoundsException, NullPointerException, etc.

The process of FIG. 2 is a programming language independent process. In one embodiment, the running of the upcoming lines of code in step 206 is performed via a new thread so that the running of the upcoming lines is undoable. If the running the upcoming lines of code in step 206 causes a modification of a variable, then exception prediction tool 106 (see FIG. 1) flushes off (i.e., undoes) all of the X steps carried out in step 206. Exception prediction tool 106 (see FIG. 1) copies data in variables that are modified in step 206 into temporary variables 112 (see FIG. 1) to ensure that the variable data does not impact the main debugging flow. A utility makes a copy in step 204 before modifying the variable data in step 206; otherwise, the running of the upcoming lines in step 206 would use the same variables used by the main debugging. The prediction of exceptions provided by the process of FIG. 2 is a helper tool in debugging and does not interfere with the normal flow of debugging. To provide performance optimization, only the variables that are modified in step 206 are copied.

In one embodiment, prior to step 202, the user makes a selection that indicates whether a debugging session will utilize only conventional debugging techniques or will utilize the process of FIG. 2.

The running of upcoming lines in 206 may perform input/output (I/O) functions, which need to be undone after the completion of one pass through the process of FIG. 2. Exception prediction tool 106 (see FIG. 1) may undo the performance of an I/O function by (1) making a copy of an I/O stream, or (2) using a predictor mode for that particular I/O, where the predictor mode provides the process of FIG. 2, and is in contrast to a conventional debugging mode. The user is aware of the predictor mode because exception prediction tool 106 (see FIG. 1) displays the result of debugging and running the upcoming lines of code with a visual indicator that indicates the predictor mode is active.

In one embodiment, a package level filter is included in system 100 (see FIG. 1) which allows exception prediction tool 106 (see FIG. 1) to identify methods under a particular package that cannot be undone after being run in step 206. In the cases in which the method in a package cannot be undone, exception prediction tool 106 (see FIG. 1) dynamically changes the predictor point from being X lines in advance of the debugging point (i.e., the line currently subject to the single-stepping) to being the same as the debugging point.

EXAMPLE

FIG. 3 is an example of a function 300 being debugged using the process of FIG. 2, in accordance with embodiments of the present invention. In the discussion of FIG. 3 presented below, line numbers refer to line numbers of function 300. In step 204 (see FIG. 2), exception prediction tool 106 (see FIG. 1) performs single-stepping debugging at line number 20. If fragmentRoot in line number 20 returned a null value, then there is a null pointer exception at line number 21. If step 202 (see FIG. 2) received a value of X as an integer greater than or equal to one, then in step 206 (see FIG. 2), exception prediction tool 106 (see FIG. 1) runs the upcoming lines of code (i.e., line numbers 21 through 21+X) in a new thread. Based on the results of running of the upcoming lines of code, exception prediction tool 106 (see FIG. 1) in step 208 (see FIG. 2) predicts the null pointer exception at line number 21 and in step 210 (see FIG. 2) warns the user of exception prediction tool 106 (see FIG. 1) of the null pointer exception.

If the value of X that exception prediction tool 106 (see FIG. 1) receives in step 202 (see FIG. 2) is 7, then exception prediction tool 106 (see FIG. 1) in step 208 (see FIG. 2) predicts one or more exceptions in the next seven lines that follow line number 20. For instance, exception prediction tool 106 (see FIG. 1) predicts the null pointer exception at line number 21. In step 210 (see FIG. 2), exception prediction tool 106 (see FIG. 1) displays the following warning to a user: "There would be a null pointer exception at line number 21." Exception prediction tool 106 (see FIG. 1) stops predicting in step 208 (see FIG. 2) after predicting the first exception it encounters, which in the example of FIG. 3 is the null pointer exception at line number 21. The warning to the user helps the user take corrective action and fix the problem indicated by the exception well before the single stepping in the debugging session encounters the actual exception. If corrective action is taken in step 212 (see FIG. 2) for the first exception predicted in step 208 (see FIG. 2) (e.g., the null pointer exception at line number 21 in FIG. 3), then exception prediction tool 106 (see FIG. 1) determines whether there is a next predicted exception (e.g., the classcast exception at line number 24 in FIG. 3) based on the execution of the upcoming lines of code. If exception prediction tool 106 (see FIG. 1) determines that there is a next predicted exception, then steps 210 and 212 (see FIG. 2) are repeated to notify the user about and take corrective action for the next predicted exception.

In the example in which X=7, the earliest in the debugging session that exception prediction tool 106 (see FIG. 1) predicts the classcast exception at line number 24 is in response to debugging line number 17 (not shown) because line number 24 is the last line in the seven lines that follow line number 17.

Computer System

Figure 4:
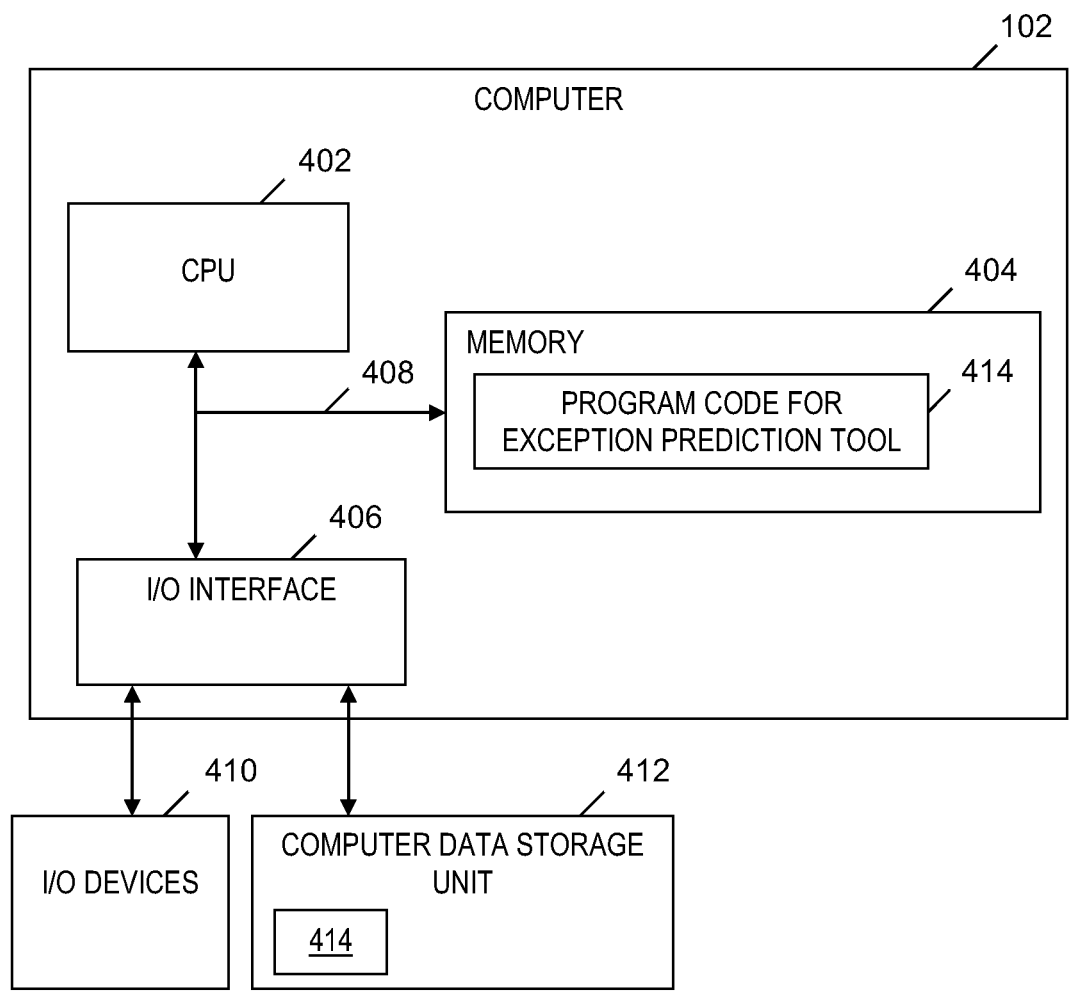
FIG. 4 is a block diagram of a computer that is included in the system of FIG. 1 and that implements the process of FIG. 2, in accordance with embodiments of the present invention.

FIG. 4 is a block diagram of a computer that is included in the system of FIG. 1 and that implements the process of FIG. 2, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 for exception prediction tool 106 (see FIG. 1) to perform a method of predicting an exception during debugging of software code before the debugging encounters the exception, where the instructions are executed by CPU 402 via memory 404. CPU 402 may include a single processing unit, or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display device, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer-readable storage medium, which is described below. In one embodiment, computer data storage unit 412 is a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are executed by CPU 402 via memory 404 to predict an exception during debugging of software code before the debugging encounters the exception. Although FIG. 4 depicts memory 404 as including program code 414, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

Storage unit 412 and/or one or more other computer data storage units (not shown) that are coupled to computer 102 may store any combination of: parameters 108 (see FIG. 1), code 110 (see FIG. 1), and exception prediction 114 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to predicting an exception during debugging of software code before the debugging encounters the exception. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to predict an exception during debugging of software code before the debugging encounters the exception. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of predicting an exception during debugging of software code before the debugging encounters the exception.

While it is understood that program code 414 for predicting an exception during debugging of software code before the debugging encounters the exception may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of predicting an exception during debugging of software code before the debugging encounters the exception. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of predicting an exception during a debugging of software code before the debugging encounters the exception, the method implemented by computer-readable program code being executed by a processor of a computer, and the method comprising the steps of:

during a debugging of a line number L of the software code and based on an exception being predicted to be encountered at a line number M, the computer displaying a warning that the exception is to be encountered at the line number M, wherein the line number M is within a range of line number (L+1) through line number (L+X), inclusively, wherein L is an integer greater than zero, and wherein X is an integer greater than one;

the computer modifying, using a fix written in response to the predicted exception, the software code; and during a debugging of the line number M of the software code, the computer executing the modified software code to avoid the predicted exception.

2. The method of claim 1, further comprising the steps of:
the computer receiving a type of an exception; and
the computer determining the predicted exception is of the type received, wherein the step of displaying the warning is further based on the predicted exception being of the type received.

3. The method of claim 1, further comprising the steps of:
the computer locally changing a variable in a function to multiple values, the function included in upcoming lines of the software code consisting of at least line number (L+1) through line (L+X) of the software code;
the computer analyzing a result of repeated performances of executing the upcoming lines of the software code, each performance of executing the upcoming lines corresponding to a respective value in the multiple values; and
based on the analyzed result, the computer predicting multiple possible exceptions resulting from the multiple values to which the variable had been locally changed.

4. The method of claim 1, further comprising the steps of:
the computer receiving a number (Y) of lines of the software code, wherein Y is an integer greater than one;
the computer debugging a current line number A of the software code, wherein A is an integer greater than zero;
the computer determining that a specified block of the software code begins within a range of a line number (A+1) of the software code and a line number (A+Y) of the software code and ends at a line number (A+Y+Z), which is after line number (A+Y), wherein Z is an integer greater than zero;
the computer executing in a new thread upcoming lines of the software code consisting of at least line number (A+1) through line number (A+Y+Z) of the software code;
based on the upcoming lines of the software code being executed in the new thread, the computer predicting that another exception will be encountered at line number N of the software code and determining the line number N is within a range of line number (A+1) through line number (A+Y+Z), inclusively, wherein N is an integer;
based on the other exception being predicted to be encountered at the line number N and the line number N being within the range of line number (A+1) through line (A+Y+Z), inclusively, and during the debugging of the current line number A, the computer displaying a warning that the other exception is to be encountered at line number N; and
the computer receiving an indication that a corrective action was taken to avoid the other exception.

5. The method of claim 1, further comprising the step of the computer receiving an indication that a corrective action was taken to avoid the exception, the indication being received without a second debugging of the software code, wherein the second debugging reproduces the exception and is subsequent to the debugging of the software code.

6. The method of claim 1, further comprising the step of the computer executing upcoming lines of the software code by copying variable data into temporary variables and executing the upcoming lines of the software code by using the temporary variables, wherein the step of copying avoids affecting a normal flow of the debugging of the software code, and wherein the upcoming lines consist of at least line number (L+1) through line number (L+X) of the software code.

7. The method of claim 1, further comprising the steps of:
the computer determining that an execution of upcoming lines of the software code includes an action of input/output (I/O), wherein the upcoming lines consist of at least line number (L+1) through line number (L+X) of the software code;
based on the action of I/O being included in the execution of the upcoming lines, the computer copying a stream in which the action of I/O is performed; and
the computer undoing the action of I/O after performing the step of executing the upcoming lines.

8. The method of claim 1, further comprising the step of:
providing at least one support service for at least one of creating, integrating, hosting, maintaining, and deploying computer-readable program code in the computer, the program code being executed by a processor of the computer to implement the steps of displaying the warning, modifying the software code, and executing the modified software code.

9. A computer program product, comprising:
a computer-readable storage medium; and
a computer-readable program code stored in the computer-readable storage medium, the computer-readable program code containing instructions that are executed by a central processing unit (CPU) of a computer system to implement a method of predicting an exception during debugging of software code before the debugging encounters the exception, the method comprising the steps of:
during a debugging of a line number L of the software code and based on an exception being predicted to be encountered at a line number M, the computer system displaying a warning that the exception is to be encountered at the line number M, wherein the line number M is within a range of line number (L+1) through line number (L+X), inclusively, wherein L is an integer greater than zero, and wherein X is an integer greater than one;
the computer system modifying, using a fix written in response to the predicted exception, the software code; and
during a debugging of the line number M of the software code, the computer system executing the modified software code to avoid the predicted exception.

10. The computer program product of claim 9, wherein the method further comprises the steps of:
the computer system receiving a type of an exception; and
the computer system determining the predicted exception is of the type received, wherein the step of displaying the warning is further based on the predicted exception being of the type received.

11. The computer program product of claim 9, wherein the method further comprises the steps of:
the computer system locally changing a variable in a function to multiple values, the function included in upcoming lines of the software code consisting of at least line number (L+1) through line (L+X) of the software code;
the computer system analyzing a result of repeated performances of executing the upcoming lines of the software code, each performance of executing the upcoming lines corresponding to a respective value in the multiple values; and
based on the analyzed result, the computer system predicting multiple possible exceptions resulting from the multiple values to which the variable had been locally changed.

12. The computer program product of claim 9, wherein the method further comprises the steps of:
the computer system receiving a number (Y) of lines of the software code, wherein Y is an integer greater than one;
the computer system debugging a current line number A of the software code, wherein A is an integer greater than zero;
the computer system determining that a specified block of the software code begins within a range of a line number (A+1) of the software code and a line number (A+Y) of the software code and ends at a line number (A+Y+Z), which is after line number (A+Y), wherein Z is an integer greater than zero;
the computer system executing in a new thread upcoming lines of the software code consisting of at least line number (A+1) through line number (A+Y+Z) of the software code;
based on the upcoming lines of the software code being executed in the new thread, the computer system predicting that another exception will be encountered at line number N of the software code and determining the line number N is within a range of line number (A+1) through line number (A+Y+Z), inclusively, wherein N is an integer;
based on the other exception being predicted to be encountered at the line number N and the line number N being within the range of line number (A+1) through line (A+Y+Z), inclusively, and during the debugging of the current line number A, the computer system displaying a warning that the other exception is to be encountered at line number N; and
the computer system receiving an indication that a corrective action was taken to avoid the other exception.

13. The computer program product of claim 9, wherein the method further comprises the step of the computer system receiving an indication that a corrective action was taken to avoid the exception, the indication being received without a second debugging of the software code, wherein the second debugging reproduces the exception and is subsequent to the debugging of the software code.

14. The computer program product of claim 9, wherein the method further comprises the step of the computer system executing upcoming lines of the software code by copying variable data into temporary variables and executing the upcoming lines of the software code by using the temporary variables, wherein the step of copying avoids affecting a normal flow of the debugging of the software code, and wherein the upcoming lines consist of at least line number (L+1) through line number (L+X) of the software code.

15. A computer system comprising:
a central processing unit (CPU);
a memory coupled to the CPU; and a computer readable storage device coupled to the CPU, the storage device containing instructions that are executed by the CPU via the memory to implement a method of predicting an exception during debugging of software code before the debugging encounters the exception, the method comprising the steps of:

during a debugging of a line number L of the software code and based on an exception being predicted to be encountered at a line number M, the computer system displaying a warning that the exception is to be encountered at the line number M, wherein the line number M is within a range of line number (L+1) through line number (L+X), inclusively, wherein L is an integer greater than zero, and wherein X is an integer greater than one;

the computer system modifying, using a fix written in response to the predicted exception, the software code; and during a debugging of the line number M of the software code, the computer system executing the modified software code to avoid the predicted exception.

16. The computer system of claim 15, wherein the method further comprises the steps of:

the computer system receiving a type of an exception; and the computer system determining the predicted exception is of the type received, wherein the step of displaying the warning is further based on the predicted exception being of the type received.

17. The computer system of claim 15, wherein the method further comprises the steps of:

the computer system locally changing a variable in a function to multiple values, the function included in upcoming lines of the software code consisting of at least line number (L+1) through line (L+X) of the software code;

the computer system analyzing a result of repeated performances of executing the upcoming lines of the software code, each performance of executing the upcoming lines corresponding to a respective value in the multiple values; and based on the analyzed result, the computer system predicting multiple possible exceptions resulting from the multiple values to which the variable had been locally changed.

18. The computer system of claim 15, wherein the method further comprises the steps of:

the computer system receiving a number (Y) of lines of the software code, wherein Y is an integer greater than one;

the computer system debugging a current line number A of the software code, wherein A is an integer greater than zero;

the computer system determining that a specified block of the software code begins within a range of a line number (A+1) of the software code and a line number (A+Y) of the software code and ends at a line number (A+Y+Z), which is after line number (A+Y), wherein Z is an integer greater than zero;

the computer system executing in a new thread upcoming lines of the software code consisting of at least line number (A+1) through line number (A+Y+Z) of the software code;

based on the upcoming lines of the software code being executed in the new thread, the computer system predicting that another exception will be encountered at line number N of the software code and determining the line number N is within a range of line number (A+1) through line number (A+Y+Z), inclusively, wherein N is an integer;

based on the other exception being predicted to be encountered at the line number N and the line number N being within the range of line number (A+1) through line (A+Y+Z), inclusively, and during the debugging of the current line number A, the computer system displaying a warning that the other exception is to be encountered at line number N; and the computer system receiving an indication that a corrective action was taken to avoid the other exception.

19. The computer system of claim 15, wherein the method further comprises the step of the computer system receiving an indication that a corrective action was taken to avoid the exception, the indication being received without a second debugging of the software code, wherein the second debugging reproduces the exception and is subsequent to the debugging of the software code.

20. The computer system of claim 15, wherein the method further comprises the step of the computer system executing upcoming lines of the software code by copying variable data into temporary variables and executing the upcoming lines of the software code by using the temporary variables, wherein the step of copying avoids affecting a normal flow of the debugging of the software code, and wherein the upcoming lines consist of at least line number (L+1) through line number (L+X) of the software code.

* * * * *